US010742519B2

(12) United States Patent
Singhal et al.

(10) Patent No.: US 10,742,519 B2
(45) Date of Patent: Aug. 11, 2020

(54) PREDICTING ATTRIBUTE VALUES FOR USER SEGMENTATION BY DETERMINING SUGGESTIVE ATTRIBUTE VALUES

(71) Applicant: Tata Consultancy Services Limited, Mumbai (IN)

(72) Inventors: Akshay Kumar Singhal, Pune (IN); Mohan Raj Velayudhan Kumar, Pune (IN); Sandip Jadhav, Pune (IN); Rahul Ramesh Kelkar, Pune (IN); Harrick Mayank Vin, Pune (IN)

(73) Assignee: Tate Consultancy Services Limited, Mumbai (IN)

( * ) Notice: Subject to any disclaimer, the term of this patent is extended or adjusted under 35 U.S.C. 154(b) by 1193 days.

(21) Appl. No.: 15/062,852

(22) Filed: Mar. 7, 2016

(65) Prior Publication Data

US 2017/0070398 A1 Mar. 9, 2017

(30) Foreign Application Priority Data

Sep. 9, 2015 (IN) .......................... 3467/MUM/2015

(51) Int. Cl.
*H04L 12/24* (2006.01)
*G06N 7/00* (2006.01)
*G06Q 10/06* (2012.01)

(52) U.S. Cl.
CPC ............. *H04L 41/16* (2013.01); *G06N 7/005* (2013.01); *G06Q 10/06315* (2013.01)

(58) Field of Classification Search
CPC ................................ H04L 41/16; G06N 7/005
See application file for complete search history.

(56) References Cited

U.S. PATENT DOCUMENTS 6,862,574 B1    3/2005  Srikant et al.
8,812,960 B1 *  8/2014  Sun ..................... H04L 61/6077
                                                          715/757

(Continued)

FOREIGN PATENT DOCUMENTS

WO    WO-2012/055104    5/2012

OTHER PUBLICATIONS

Wu, Yi-Hung, Yong-Chuan Chen, and Arbee LP Chen. "Enabling personalized recommendation on the web based on user interests and behaviors." RIDE 2001. IEEE, 2001. (Year: 2001).*

(Continued)

*Primary Examiner* — Alexey Shmatov
*Assistant Examiner* — Robert Bejcek, II
(74) *Attorney, Agent, or Firm* — Finnegan, Henderson, Farabow, Garrett & Dunner LLP

(57) ABSTRACT

This disclosure relates generally to performing user segmentation, and more particularly to predicting attribute values for user segmentation. In one embodiment, the method includes segregating a user with an incomplete attribute value and a user with complete attribute values for an attribute into a first group and a second group respectively, computing prior probability for each suggestive attribute value, identified for the incomplete attribute value, based on number of users in second group having the suggestive attribute value as attribute value for the attribute. Computing likelihood for each suggestive attribute value based on similarity of the attribute values of the user of the first group with users of the second group, computing a posterior probability for each suggestive attribute value based on the prior probability and the likelihood, selecting a suggestive attribute value with the highest posterior probability as the attribute value for the incomplete attribute value of the user.

14 Claims, 5 Drawing Sheets

(56) References Cited

U.S. PATENT DOCUMENTS

2003/0063779 A1* 4/2003 Wrigley ............... G06Q 30/02
                                                                    382/116
2009/0293121 A1  11/2009  Bigus et al.
2012/0042262 A1   2/2012  Priyadarshan et al.

OTHER PUBLICATIONS

Aghabozorgi et al. Incremental Clustering of Time-Series by Fuzzy Clustering. Journal of Information Science and Engineering 28, 671-688 (2012) (Year: 2012).*

* cited by examiner

PREDICTING ATTRIBUTE VALUES FOR USER SEGMENTATION BY DETERMINING SUGGESTIVE ATTRIBUTE VALUES

PRIORITY CLAIM

This U.S. patent application claims priority under 35 U.S.C. § 119 to: India Application No. 3467/MUM/2015, filed on 9 Sep. 2015. The entire contents of the aforementioned application are incorporated herein by reference.

TECHNICAL FIELD

This disclosure relates generally to performing user segmentation, and more particularly to predicting attribute values for user segmentation.

BACKGROUND

Generally, enterprises deploy Information Technology (IT) infrastructure for providing tools and services to their employees and users. A typically sized enterprise with a large number of users may have different users with different IT needs. The IT needs may vary depending on job roles and working habits of users with respect to the type of device, the type of network connection, the type of operating system, type of application, location of accessing a device, and the like. In order to define the tools, the services and the policies that can be provided to different users with different IT needs, the users are grouped or segmented into multiple segments depending on similarities in their needs. The segmentation of users into segments and the provisioning of IT infrastructure specific to the segments are observed to have a positive impact on users' working experience and productivity. However segmentation of users into segments is a challenging task owing to dynamic of user needs, inaccuracy of user characteristic data, time consuming conventional methods and the like.

SUMMARY

Embodiments of the present disclosure present technological improvements as solutions to one or more of the above-mentioned technical problems recognized by the inventors in conventional systems. For example, in one embodiment, the present disclosure provides a method for predicting an attribute value associated with a user for user for segmenting the user into a segment, the segment being indicative of users utilizing similar computing resources, the method comprising: obtaining, by a processor, an attribute value for each attribute from amongst a plurality of attributes associated with each user from amongst a plurality of users, wherein the plurality of attributes is common to each user from amongst the plurality of users, and wherein the attribute value is indicative of a manner of utilization of a computing resource by the user; segregating, by said processor, the user with at least one incomplete attribute value for at least one attribute from users with complete attribute values for each attribute from amongst the plurality of attributes, into a first group, wherein the first group includes the user with the at least one incomplete attribute value, and wherein users with complete attribute values for each attribute are segregated into a second group; and identifying, by said processor, one or more suggestive attribute values for the at least one incomplete attribute value of the user in the first group based on attribute values of the at least one attribute associated with the users of the second group; computing, by said processor, prior probability for each suggestive attribute from amongst the one or more suggestive attribute values based on number of users in second group having the suggestive attribute value as attribute value for the at least one attribute of the user in the first group and the total number of users in the second group; computing, by said processor, likelihood for each suggestive attribute value based on number of users in the second group with attribute values for attributes, other than the at least one attribute, similar to the attribute values for the attributes of the user in the first group and the total number of users in the second group; computing, by said processor posterior probability for each suggestive attribute value based on the prior probability of the one or more suggestive attribute values and the likelihood of the one or more suggestive attribute values; and determining, by said processor a suggestive attribute value from amongst the one or more suggestive attribute values with the highest posterior probability as the attribute value for the at least one incomplete attribute value for segmenting the user.

In another embodiment, the attribute value for each attribute is associated with one or more factors from a group consisting of type of applications and devices used by users, number and manner of interaction with the devices, location of accessing the device level of access, role and autonomy of the users associated with an enterprise, collaborative resources, device ownership, user privacy, and remote data access.

In another embodiment, computing likelihood for each suggestive attribute value comprises computing a total likelihood for each suggestive attribute value based on likelihood for each attribute of the user for the suggestive attribute value.

In another embodiment, the method as described herein above further comprising: tracking one or more attribute values of the one or more attributes associated with the one or more users to determine a change in the one or more attributes values; re-aligning one or more users from amongst the plurality of users into existing segments, the re-aligning comprising: determining suitability of mapping the one or more users with the one or more attribute values into the existing segments based on the changed one or more attribute values; assigning the assigning the one or more users to the existing segments based on the changed one or more attribute values in response to determining that the one or more users are suitable for mapping into the existing segments, wherein a user from amongst the one or more users can be assigned to another segment, during the realigning.

In another embodiment, the method as described herein above further comprising: identifying the one or more users to be segmented into new segments based on the determining that the one or more users are not suitable for mapping into the existing segments; generating one or more new segments for the one or more users by utilizing one of the past segmentation results and the clustering technique, wherein the one or more new segments are generated based on the changed one or more attribute values of the one or more users; and assigning the one or more users to the one or more new segments based on the changed one or more attribute values.

In another embodiment, the method as described herein above further comprising: identifying one or more segments from amongst the existing segments that are unassociated with any user from amongst the plurality of users for a predefined time; and eliminating the one or more segments from the existing segments.

In yet another embodiment, a method is provided for predicting an attribute value associated with a user of a segment, the segment being indicative of users utilizing similar computing resources associated with an enterprise, the method comprising: obtaining, by a processor, an attribute value for each attribute from amongst a plurality of attributes associated with each user from amongst a plurality of users, wherein the plurality of attributes is common to each user from amongst the plurality of users, and wherein the attribute value is indicative of a manner of utilization of a computing resource by the user; segregating, by said processor, the user with at least one incomplete attribute value for at least one attribute from users with complete attribute values for each attribute from amongst the plurality of attributes, into a first group, wherein the first group includes the user with the at least one incomplete attribute value, wherein users with complete attribute values for each attribute are segregated into a second group; clustering, by said processor, the second group into two or more segments based on one of past segmentation results and a clustering technique using a clustering technique if past segmentation result is not available; selecting, by said processor the segment from amongst the two or more segments for the user in the first group based on posterior probability of the segment for predicting the attribute value, wherein the posterior probability of the segment is computed based on prior probability of the segment and likelihood of the segment, wherein the prior probability is computed, by said processor, based on number of users in each segment and the total number of users in the two or more segments, and the likelihood is computed, by said processor, based on the number of users in each segment with attribute values for attributes, other than the at least one attribute, similar to the attribute values for the attributes of the user.

In an embodiment, the method as described herein above further comprising: identifying one or more suggestive attribute values for the at least one incomplete attribute value of the user in the first group based on attribute values of the at least one attribute associated with the users of the segment; computing prior probability for each suggestive attribute value from amongst the one or more suggestive attribute values based on number of users in segment having the suggestive attribute value as attribute value for the at least one attribute of the user in first group and the total number of users in the segment; computing likelihood for each suggestive attribute value based on number of users in the segment with attribute values for attributes, other than the at least one attribute, similar to the attribute values for the attributes of the user and the total number of users in the segment; computing posterior computing posterior probability for each suggestive attribute value based on the prior probability of the of the suggestive attribute value and the likelihood the likelihood of the suggestive attribute value; and selecting a suggestive attribute value from amongst the one or more suggestive attribute values with the highest posterior probability as the attribute value for the at least one incomplete attribute value.

In an embodiment there is provided a user segmenting system for predicting an attribute value for at least one attribute from amongst a plurality of attributes associated with a user from amongst a plurality of users for segmenting the user into a segment, the segment being indicative of users utilizing similar computing resources, the user segmenting system comprising: a processor; a memory coupled to the processor, wherein the processor executes a plurality of modules stored in the memory, and wherein the plurality of modules comprises: a collection module coupled to the processor, wherein the collection module is to obtain an attribute value for each attribute from amongst the plurality of attributes for each user from amongst the plurality of users, wherein the plurality of attributes is common to each user of the plurality of users, wherein the attribute value is indicative of a manner of utilizing a computing resource associated with the corresponding attribute; and a segregating module coupled to the processor, wherein the segregating module is to segregate the user with at least one incomplete attribute value for the at least one attribute from users with a complete attribute value for each attribute from amongst the plurality of attributes, into a first group, wherein the first group includes the user with the at least one incomplete attribute value, and wherein the users with complete attribute value for each attribute is segregated into a second group; a computing module configured to: identify one or more suggestive attribute values for the at least one incomplete attribute value of the user in first group based on attribute values of the at least one attribute associated with the users of the second group; compute prior probability for each suggestive attribute value from amongst the one or more suggestive attribute values based on number of users in second group having a suggestive attribute value as attribute value for the incomplete attribute of the user in first group and the total number of users in the second group; compute likelihood for each suggestive attribute value based on number of users in the second group with attribute values for attributes, other than the at least one attribute, similar to the attribute values for the attributes of the user; and compute posterior probability for the one or more suggestive attribute values based on the prior probability of the one or more suggestive attribute values and the likelihood of the one or more suggestive attribute values; a predicting module coupled to the processor to recommend a suggestive attribute value from amongst the one or more suggestive attribute values with the highest posterior probability as the attribute value for the at least one incomplete attribute value for segmenting the user.

In yet another embodiment, the system as described herein above further comprising: a clustering module to cluster the second group into two or more segments by utilizing one of past segmentation results and a clustering technique to select a segment from amongst the two or more segments for the user based on posterior probability of the segment, wherein the posterior probability of the segment is computed based on prior probability of the segment and likelihood of the segment.

In yet another embodiment, the system as described herein above wherein the clustering module is further configured to: track one or more attribute values of the one or more attributes associated with the one or more users to determine a change in the one or more attributes values; re-align one or more users from amongst the plurality of users into existing segments by tracking one or more attribute values of the one or more attributes associated with the one or more users to determine a change in the one or more attributes values; determine if the one or more users with the one or more attribute values are suitable to be mapped into the existing segments based on the changed one or more attribute values; assign the one or more users in the existing segments based on the changed one or more attribute values in response to determining that the one or more users can be mapped into the existing segments; generate one or more new segments for the one or more users by utilizing one of the past segmentation results and the clustering technique to assign the one or more users to the one or more new segments; assign the one or more users to the one or more new segments based on the changed one or more attribute values; and identify the one or more segments from amongst the existing segments that are unassociated with any user from amongst the plurality of users for a predefined time; and eliminate the one or more segments from the existing segments by identifying one or more segments from amongst the existing segments that are unassociated with any user from amongst the plurality of users for a predefined time.

In yet another embodiment, the computing module is further to: identify one or more suggestive attribute values for the at least one incomplete attribute value of the user in first group based on attribute values of the at least one attribute associated with the users of the segment; compute prior probability for each of the suggestive attribute values based on number of users in segment having suggestive attribute value as attribute value for the incomplete attribute of the user in first group and the total number of users in the segment; compute total likelihood for the one or more suggestive attribute values based on likelihood of all the complete attribute values of user in first group. Likelihood of each attribute value of the user in first group is based on number of users with the same attribute value in segment; compute posterior probability for the one or more suggestive attribute values based on the prior probability of the one or more suggestive attribute values and the total likelihood of the one or more suggestive attribute values; and determine suitability of mapping the one or more users with the one or more attribute values into the existing segments based on the changed one or more attribute values.

In yet another embodiment, there is provided a non-transitory computer-readable medium comprising instructions for predicting an attribute value for at least one attribute from amongst a plurality of attributes associated with a user for segmenting the user into a segment, the segment being indicative of users utilizing similar computing resources, executable by a processor resource to: obtain an attribute value for each attribute from amongst the plurality of attributes for each user from amongst the plurality of users, wherein the plurality of attributes is common to each user of the plurality of users, wherein the attribute value is indicative of a manner of utilizing a computing resource associated with the corresponding attribute; segregate the user with at least one incomplete attribute value for the at least one attribute from users with a complete attribute value for each attribute from amongst the plurality of attributes, into a first group, wherein the first group includes the user with the at least one incomplete attribute value, and wherein the users with complete attribute value for each attribute is segregated into a second group; identify one or more suggestive attribute values for the at least one incomplete attribute value of the user in first group based on attribute values of the at least one attribute associated with the users of the second group; compute prior probability for each suggestive attribute values from amongst the one or more suggestive attribute values based on number of users in second group having the suggestive attribute value as attribute value for the at least one attribute of the user in first group and the total number of users in the second group; compute likelihood for the one or more suggestive attribute values based on number of users in the second group with attribute values for attributes, other than the at least one attribute, similar to the attribute values for the attributes of the user; compute posterior probability for the one or more suggestive attribute values based on the prior probability of the one or more suggestive attribute values and the likelihood of the one or more suggestive attribute values; and determine a suggestive attribute value from amongst the one or more suggestive attribute values with the highest posterior probability as the attribute value for the at least one incomplete attribute value for segmenting the user.

In another embodiment, the non-transitory computer-readable medium wherein the instructions for predicting an attribute value for segmenting the user are further to: select a segment from amongst the two or more segments for the user based on posterior probability of the segment, wherein the posterior probability of the segment is computed based on prior probability of the segment and likelihood of the segment; identify one or more suggestive attribute values for the at least one incomplete attribute value of the user in first group based on attribute values of the at least one attribute associated with the users of the segment; computing prior probability for each suggestive attribute value from amongst the one or more suggestive attribute values based on number of users in the segment having the suggestive attribute value as attribute value for the at least one attribute of the user in the first group and the total number of users in the segment; compute likelihood for each suggestive value based on number of users in the segment with attribute values for attributes, other than the at least one attribute, similar to the attribute values for the attributes of the user and the total number of users in the segment; compute posterior probability for each suggestive value based on the prior probability of the suggestive attribute value and the likelihood of the suggestive attribute value; and select a suggestive attribute value from amongst the one or more suggestive attribute values with the highest posterior probability as the attribute value for the at least one incomplete attribute value.

In another embodiment, the non-transitory computer-readable medium wherein the instructions for predicting an attribute value for segmenting the user are further to: track one or more attribute values of the one or more attributes associated with the one or more users to determine a change in the one or more attributes values; re-align one or more users from amongst the plurality of users into existing segments, the re-align comprises: determine suitability of mapping the one or more users with the one or more attribute values into the existing segments based on the changed one or more attribute values; and assign the one or more users in the existing segments based on the changed one or more attribute values in response to determining that the one or more users are suitable for mapping into the existing segments.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some implementations of systems and/or methods in accordance with implementations of the present subject matter are now described, by way of example only, and with reference to the accompanying figure(s), in which.

Figure 1:
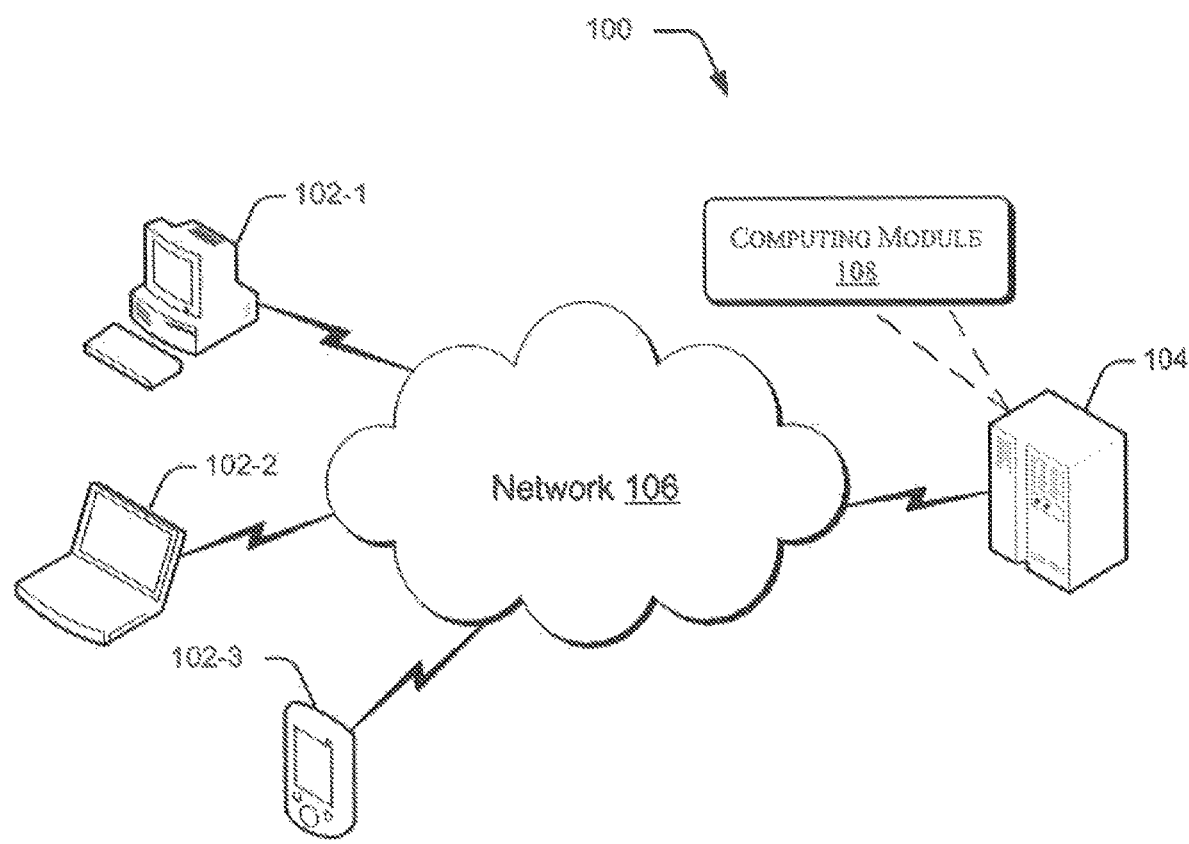
FIG. 1 illustrates a network environment, implementing a user segmenting system, according to an implementation of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

Techniques for predicting attribute values for user segmentation are described. For segmenting a user into existing segments, data related to user behavior in terms of usage of computing resources may be collected and analyzed to identify an optimal segment for the user.

Conventionally, various techniques for predicting user characteristic have been developed that segment the user in a segment from amongst multiple segments of an enterprise. One such technique leverages a user request for a content to collect data related to the user, such as a type of device used by the user, an application used for the user request, and software executed on the device. The technique also analyzes information about the usage of the content, searches conducted by the user, and other usage related information to gather the data related to the user. The data so collected is then utilized to infer user characteristics for the user.

The user characteristics can be understood as information related to the user that may be used to determine work style and behavior of the user. In one aspect, the user characteristics can be associated with personal information of the user. For instance, a particular type of device and application used for sending the user request can be classified as user characteristics for the user and personal information such as, gender information can also be classified as user characteristics for the user. The user characteristics, for instance gender of the user, can be inferred from one or more data associated with the user, such as from salutation used by the user or from known users that are similar to the user. Similarly, user characteristic such as mobility can be inferred based on other features such as the department a user works in or the device type used, etc. When the user characteristics are inferred from known users, the technique includes comparing the user with all other users of the known users to find a similar user. Thereafter, user characteristics for the user are inferred to be same as the user characteristics of the similar user.

After inferring the user characteristics corresponding to the user, a confidence score is assigned to the user characteristics to indicate correctness of the user characteristics. For example, when a gender is inferred from a salutation, a confidence score of 95% is assigned to the gender because a user's salutation usually is a valid indication of the gender. In another example, when the gender is inferred from the known users, the confidence score of 50% may be assigned to the gender due to possibility of correlation errors with indirectly related attributes.

For instances when the confidence score is low, more data may be analyzed to improve the confidence score of the user characteristics. In the said example, as the confidence score of the gender is 50% when inferred based on the known users, more data that is indicative of the gender of the user may be collected and analyzed the data such that the confidence score of 50% can be improved to an acceptable value. After obtaining a complete set of user characteristics and the acceptable value of the confidence score, the user may be segmented into a segment from amongst the multiple segments.

Therefore, for such instances, a large volume of data may be collected in multiple iterations and then analyzed to segment the user into the segment which is a time consuming task. Hence, such a technique is time consuming, where a substantial amount of time and effort is required before the system starts segmenting the user into the segment.

Further the technique collects the data from different sources to infer the user characteristics and during such collection any discrepancy in the collected data may result in an erroneous value of the confidence score thereby leading to incorrect user segmentation. Also, any incompleteness in the collected data may impact the quality of the user segments. The conventional techniques fail to perform user segmentation based on incomplete data.

Furthermore, the user characteristics so determined for the user may be inaccurate as the accuracy of the user characteristics so inferred depends upon the confidence score of the inferred user characteristics which may be below an acceptable level for some data. For instance, the confidence score of the gender information is 50% when inferred based on the known users.

Also, it is observed that IT needs of users are dynamic in nature and vary over time due to factors such as user role change, technology change, experience gained, and environment change. Due to the dynamic needs of the user, new segments may have to be created frequently for incorporating users with changed needs and some segments may have to be deleted. Also, some users may have to be migrated between different segments as their needs vary. On such instances, the frequent creation and deletion of user segments and migration of users within different segments is costly and time consuming. The conventional techniques do not describe any standard approach to account for dynamic in user needs.

In accordance with an example implementation of the present subject matter, techniques for predicting attribute values for user segmentation are described. The described techniques are time efficient as they prevent repeated collection of data for determining the user characteristics and estimating confidence score every time the data is collected. Further the described techniques predict attribute value without being affected by discrepancy or incompleteness in one or two data. In addition, the described techniques provide a higher degree of accuracy in predicting the attribute value for user segmentation and efficiently segment the user with dynamic and changing needs into existing segments.

In an implementation of the present subject matter, a method for predicting attribute value associated with a user associated with an enterprise for segmenting the user into a segment of users utilizing similar computing resources is described. The method includes obtaining an attribute value for each attribute from amongst multiple attributes associated with each user from amongst multiple users associated with the enterprise. The multiple attributes may be common to each user, and the attribute value may be indicative of a manner of utilization of a computing resource by a user.

In a scenario, the attribute values may be obtained based on information provided by a sample set of users in survey forms. The information may be related to current usage of a computing resource and future needs of the computing resource of a user corresponding to one or more attributes such as, security, and personalization. However, on many instances, some users from amongst the sample set of users may not be able to provide the information for one or more attributes due to unavailability of appropriate data and therefore the attribute values for such one or more attributes may be incomplete or missing. Thus, the attribute values so obtained for such one or more attributes remain incomplete or missing. For ease of explanation, such attribute values that are incomplete or missing are referred to as incomplete attribute values hereinafter.

The method may thereafter include segregating users with one or more incomplete attribute values for the one or more attributes from other users with complete attribute value for each attribute, into a first group and grouping the other users in a second group. After the segregation, the first group may include the users with one or more incomplete attribute values, and the second group may include the other users with a complete attribute value for each attribute.

In an implementation of the present subject matter, after segregating the users, the method includes identifying an incomplete attribute value of an attribute of a user from amongst the users included in the first group for which an attribute value is to be predicted. Thereafter, one or more suggestive attribute values may be identified for the incomplete attribute value of the attribute. The one or more suggestive attribute values may be identified based on attribute values of the attribute of the other users included in the second group. For example, a user 1 from the first group has an incomplete attribute value for attribute mobility and other users have one of 0, 50 and 100, as attribute values for mobility in the second group. The attribute values 0, 50, and 100 are then selected as the one or more suggestive attribute values for the incomplete attribute value for mobility of the user 1.

Upon identifying the one or more suggestive attribute values, a prior probability may be computed for each suggestive attribute value. The prior probability for a suggestive attribute value may be computed based on number of users in the second group having the suggestive attribute value as attribute value for the attribute and total number of users in the second group. For instance, if the second group includes 10 users, where 5 users have attribute value 0 for the attribute mobility, the prior probability for the suggestive attribute value 0 may be computed based on number of users with 0 as the attribute value for mobility, i.e., 5 and total number of users in the second group, i.e., 10.

Thereafter, a likelihood may be computed for the suggestive attribute value based on number of users in the second group with attribute values for other attributes similar to the attribute values of the other attributes of the user and the total number of users in the second group.

Further, the method includes computing posterior probability for the suggestive attribute value based on the prior probability of the suggestive attribute value and the likelihood of the suggestive attribute value. Similarly, posterior probability is computed for each suggestive attribute value. After computing the posterior probability for each suggestive attribute value, a suggestive attribute value from amongst the one or more suggestive attribute values with the highest posterior probability is determined as the attribute value for the incomplete attribute value of the attribute of the user. In a similar manner, an attribute value is determined for each incomplete attribute value from amongst the one or more incomplete attribute values of the user and remaining users of the first group. After obtaining attribute value for each incomplete attribute value of each attribute of each user, the users of the first group may be segmented into optimal segments based on the attribute values.

Techniques of the present subject matter provide a time efficient and an accurate method for predicting attribute value associated with the user based on the prior probability, the likelihood and the posterior probability. Further, the present subject matter segments user with dynamic behavior into optimal segments by tracking the attribute values associated with the user.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for explanatory purposes to aid the reader in understanding the principles of the invention and the concepts contributed by the inventor(s) to furthering the art, and are to be construed as being without limitation to such specifically recited examples and conditions. Moreover, all statements herein reciting principles, aspects and implementations of the invention, as well as specific examples thereof, are intended to encompass equivalents thereof.

The above mentioned methods and systems are further described with reference to FIG. 1 to FIG. 5. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and specific examples thereof, are intended to encompass equivalents thereof.

FIG. 1 illustrates a network environment 100 according to an implementation of the present subject matter. The network environment 100 may either be a public distributed environment or may be a private closed network environment. The environment 100 may include different user devices 102-1, 102-2, . . . , 102-N associated with an enterprise, communicatively coupled to a user segmenting system 104 through a network 106. For the sake of explanation, the user devices 102-1, 102-2, . . . , 102-N, have been commonly referred to as user devices 102, and have been individually referred as user device 102, hereinafter. Further, the user segmenting system 104 may include a computing module 108 for computing prior probability for one or more suggestive values, and likelihood and posterior probability for the one or more suggestive values for predicting the attribute value associated with a user.

Among other capabilities, the user device 102 may be a portable device that is capable of transmitting and receiving wireless signals from the user segmenting system 104. Examples of the user device 102 includes, personal digital assistants, smart phones, hand held devices, mobile phones, laptops and the like.

In an implementation, the user segmenting system 104 may be a device to collect data related to the user and predict attribute values for segmenting the user into a segment from amongst existing segments or newly created segments. Amongst other capabilities, the user segmenting device may be a server, to collect and process large volume of data associated with users associated with the enterprise.

The network 106 may be a wireless or a wired network, or a combination thereof. The network 106 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NON), Public Switched Telephone Network (PSTN), and Integrated Services Digital Network (ISDN). Depending on the technology, the network 106 includes various network entities, such as transceivers, gateways, and routers; however, such details have been omitted for ease of understanding.

In an implementation of the present subject matter, the network environment 100 is associated with an enterprise that serves users based on their Information Technology (IT) needs. The users may have different roles, responsibilities and level of autonomy in the enterprise and may be associated with respective user devices 102. For example, a user 'A' may be associated with user device 102-1 and may be working on secure applications for a project of the enterprise. Such a user may need higher security due to the type of applications used for the project and less mobility as the user A may be working within a particular room or a laboratory without changing the location. The IT needs of the user can be understood as requirements related to computing resources of the users that are based on user behavior, user role, responsibility, technology platform. In particular, the IT needs can be characterized based on type of applications and devices used by the users, interaction of the users with the applications and the devices, location of accessing the device, mobility of the user, degree of mobility of the user. Further, the IT needs can be characterized based on level of access provided to the users, role and level of autonomy provided to the users in the enterprise, their collaboration needs, their device ownerships, user's privacy needs, and their remote data wipe.

In an example of the present subject matter, the user behavior, the user role, and responsibility are tracked in terms of feature attributes, referred to as attributes hereinafter, where each attribute is associated with a corresponding value, referred to as an attribute value hereinafter, to represent an extent of need of the respective attribute by the user.

The attributes may be classified as mobility, privacy, security, personalization, criticality, etc. In the previous example, the user A may have an attribute value 100 for the attribute security based on the type of applications used by the user and an attribute value 0 for the attribute mobility as the user is not changing the location. Further, the attribute values associated with the attributes of the user vary widely based on the role of user, nature of job, and level of autonomy in the enterprise. For instance, a user in sales department may have to work on a tablet or a laptop to personally interact with customers at different locations and therefore attribute value for mobility is high for such a user, whereas another user performing data entry tasks may have to work on a desktop to fill in data from one location and therefore the attribute value for mobility of such a user is low.

In the present subject matter, the user segmenting device 104 may collect such attribute values from the user devices 102 to assess IT needs of the user and segment the users into different segments, where each segment represent a group of users with similarity in usage of computing resources in terms of similarity in IT needs of the users. In a scenario, the attribute values may also be collected from other devices that are related to the user devices 102 and can provide the attribute values associated with the user devices 102. Examples of such devices can be application servers or web servers that provide applications and online content to the user devices 102. Such devices can provide data related to type of applications and content requested by the users and different locations from where the applications and the online content are requested by the user devices 102.

The attribute values may usually be collected from the user device 102 through surveys by sending survey forms along with questionnaires to a sample set of users. The sample set of users may then complete the survey forms or the questionnaires to provide information corresponding to the attribute values. However, on some instances, it is not possible to obtain the completed surveys from the sample set of users due to the surveys not getting completed by number of users within the sample set. A regular follow up may then be performed to request the users to complete the surveys. In such a process, an unnecessary delay may be caused in collecting the attribute values from the user and some attribute values may not be collected at all. Further, some of the attribute values may not be successfully collected from the user devices due to other factors such as, data source unavailability, system architecture complexity, interface dependency aspects, performance aspects and manual intervention requirements. Therefore, during collection of the attribute values, one or more attribute values could remain missing or incomplete.

After collecting the attribute values, the user segmenting system 104 identifies such incomplete attribute values and utilizes the computing module 108 to predict an optimum attribute values for such identified incomplete attribute values. The computing module 108 can be understood as a module for performing computation based on different probabilistic techniques to predict attribute values for an incomplete attribute value. In particular, the computing module 108 may identify one or more suggestive values for the incomplete attribute value associated with an attribute of a user. The one or more suggestive values can be understood as attribute values of the attribute associated with other users. Thereafter, the computing module 108 may compute prior probability of the one or more suggestive attribute values based on number of users with the one or more suggestive values as the attribute values and total number of users associated with the attribute. Thereafter, the computing module 108 may compute likelihood of the one or more suggestive attribute value based on number of users with attribute values for attributes, other than the attribute, similar to attribute values for the attributes of the user and the total number of users.

In an implementation of the present subject matter, after computing the likelihood, the computing module 108 may compute posterior probability for the one or more suggestive attribute values based on the prior probability and the likelihood for the one or more suggestive attribute values. The user segmenting system 104 may also select a suggestive attribute value from amongst the one or more suggestive attribute values as the attribute value for the incomplete attribute value based on the posterior probability of the one or more suggestive attribute values. The explanation regarding functioning of the user segmenting system 104 and predicting the attribute value for user segmentation have been further explained in detail with respect to the description of forthcoming figures.

Figure 2:
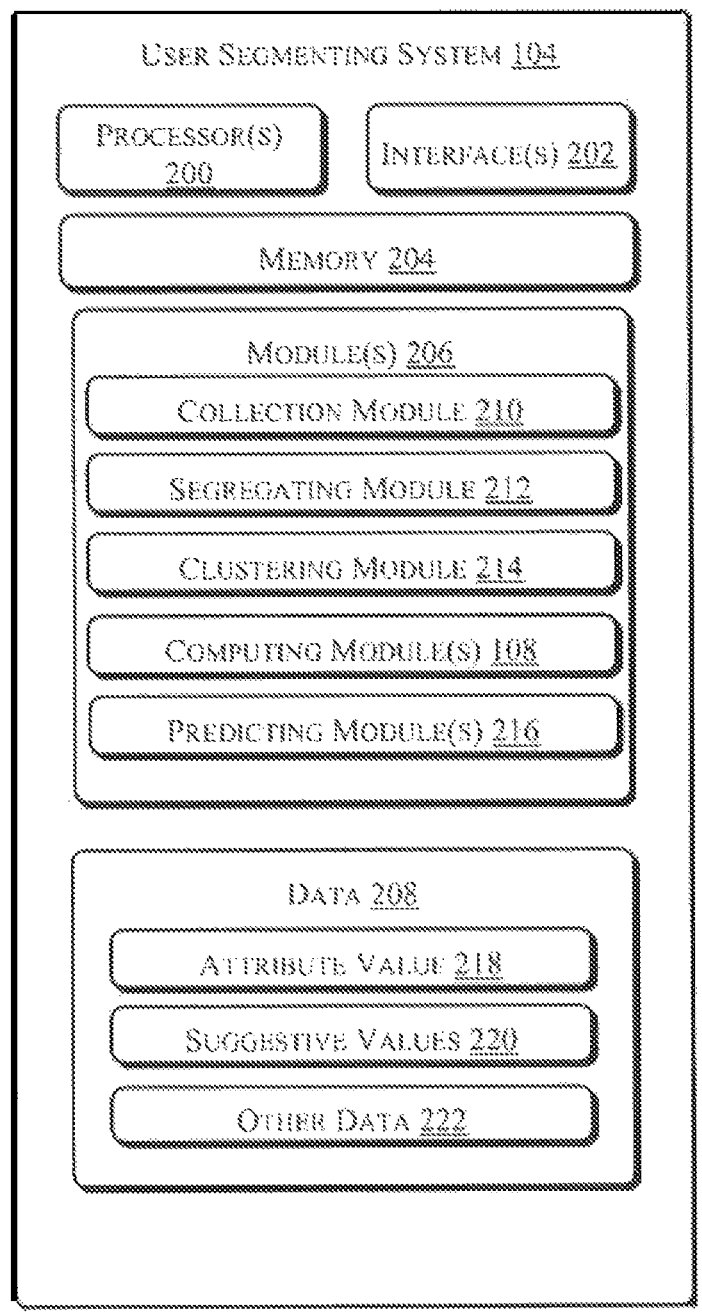
FIG. 2 illustrates components of the user segmenting system, in accordance with an implementation of the present subject matter.

FIG. 2 illustrates components of the user segmenting system 104, in accordance with an implementation of the present subject matter. The user segmenting system 104 may include a processor 200, an interface 202, and a memory 204. Further, the user segmenting system 104 may include modules(s) 206 and data 208.

The processor 200, amongst other capabilities, may be configured to fetch and execute computer-readable instructions stored in the memory 204. The processor 200 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processor(s)", may be provided through the use of dedicated hardware as well as hardware capable of executing software in association with appropriate software.

When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 202 may include a variety of machine readable instructions-based interfaces and hardware interfaces that allow the location detection system 102 to interact with different entities, such as the processor 200, the module 206, and the data 208. Further, the interface(s) 202 may enable the components of the user segmenting system 104 to communicate with other user segmenting systems, and external repositories. The interface 202 may facilitate multiple communications within a wide variety of networks and protocol types, including wireless networks, wireless Local Area Network (WLAN), RAN, satellite-based network, etc.

The memory 204 may be coupled to the processor 200 and may, among other capabilities, provide data and instructions for generating different requests. The memory 204 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The module(s) 206 may include routines, programs, objects, components, data structures, and the like, which perform particular tasks or implement particular abstract data types. The module(s) 206 may further include modules that supplement applications on the location detection system 102, for example, modules of an operating system. Further, the module 206 can be implemented in hardware, instructions executed by a processing unit, or by a combination thereof.

In another aspect of the present subject matter, the module(s) 206 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

The data 208 serves, amongst other things, as a repository for storing data that may be fetched, processed, received, or generated by one or more of the module(s) 206.

The module(s) 206 may perform different functionalities which may include, but may not be limited to, collecting attribute value for each attribute from the user devices 102, segregating users with incomplete attribute value for one or more attributes from users with complete value for each attribute, clustering users with similar needs in common segments, performing computation using probabilistic techniques and selecting a value for an incomplete attribute value. Accordingly, the module(s) 206 may include a collection module 210, a segregating module 212, a clustering module 214, the computing module 108, and a predicting module 216. The data 208 may include attribute values 218, suggestive values 220, and other data 222. The other data 222 may include past segmentation result data.

For ease of explanation, the process of predicting attribute values for user segmentation and functioning of components of the user segmenting system 104 have been described based on two approaches, a holistic approach and a segment based approach.

In the holistic approach, the collection module 210 may collect an attribute value for each attribute from amongst multiple attributes associated with each user from amongst multiple users associated with an enterprise. The collection module 210 may collect the attribute values from multiple data sources such as, System Centre Configuration Manager (SCCM) of the enterprise, performance logs, network logs, software and applications installed and used logs, application access logs, hardware and software inventory reports, and survey reports. In a scenario, the collection module 210 may collect the attribute values from each user device 102 from amongst the multiple user devices. The collection module 210 may then collate the collected attribute values into a format represented by a user model. The user model can be understood as a tabular representation of the multiple users associated with the enterprise and status of theft current usage and need for IT resources. In an example implementation, the user model is represented in form of table 1.

TABLE 1

| User Id | Mobility | Criticality | Security | Support | Workload | Grade |
|---|---|---|---|---|---|---|
| User1 | 0 | 100 | 100 | 50 | 100 | 100 |
| User2 | 0 | 100 | 100 | 50 | 100 | 50 |
| User3 |  | 100 | 100 | 0 |  | 50 |
| User4 | 0 | 100 | 100 | 0 | 100 | 100 |
| User5 | 0 |  | 50 | 0 | 100 |  |
| User6 | 0 | 100 | 100 |  | 100 | 50 |
| User7 |  |  | 100 | 0 |  | 50 |
| User8 | 0 | 50 | 100 | 0 | 100 | 50 |
| User9 | 100 | 100 | 100 | 50 | 100 | 100 |
| User10 | 0 | 50 | 50 | 0 | 100 | 50 |
| User11 | 0 | 50 | 50 | 50 | 100 | 100 |
| User12 | 0 | 50 | 50 | 0 | 100 | 50 |
| User13 | 0 | 50 | 50 | 50 | 100 | 50 |
| User14 |  | 50 |  | 0 | 100 | 0 |
| User15 | 0 | 100 | 100 | 0 | 100 | 50 |
| User16 | 100 |  | 100 | 50 |  | 0 |
| User17 | 0 | 50 | 50 | 0 | 100 | 50 |

TABLE 1-continued

| User Id | Mobility | Criticality | Security | Support | Workload | Grade |
|---|---|---|---|---|---|---|
| User18 | 0 | 50 | 100 | 0 | 50 | 100 |
| User19 | 0 | 100 | 50 | 50 | 100 | 50 |
| User20 | 0 | 100 | 100 | 0 | 100 | 50 |

Table 1 illustrates the user model with the multiple users, where each user is associated with the multiple attributes and each attribute from amongst the multiple attribute has an attribute value. Each row of the table 1 indicates a user and attribute values of the user across the multiple attributes and each column represents an attribute and attribute values of the attribute across the multiple users. For example, the user 1 has the attribute value 0 for the attribute mobility, an attribute value 100 for criticality, and an attribute value 100 for security and user 2 has attribute value 0 for mobility, attribute value 100 for criticality and attribute value 100 for security.

The user model so collated, may also include incomplete or missing attribute values that could not be collected successfully from the user devices 102 for the reasons described in the description of FIG. 1. In the said example implementation, the table 1 illustrates incomplete or missing attribute values for attributes associated with the users in form of empty cells of the table. For instance, the user 3 has empty cells for the attributes mobility, and workload. Similarly, other users, user 5, user 6, and user 7 have incomplete attribute values that are represented by respective empty cells of the table 1.

In an implementation of the present subject matter, after collating the collected attribute values in form of the user model, the segregating module 212 may access the user model and segregate one or more users from amongst the multiple users with one or more incomplete attribute values for the attributes from other users with complete attribute value for each attribute into a first group. The other users with complete attribute value for each attribute may be grouped into a second group. In the example implementation, the multiple users as shown in table 1 are segregated into the first group as shown in table 2.1 that includes the one or more users and into the second group as shown in table 2.2 that includes the other users.

TABLE 2.1

| User Id | Mobility | Criticality | Security | Support | Workload | Grade |
|---|---|---|---|---|---|---|
| User3 |  | 100 | 100 | 0 |  | 50 |
| User5 | 0 |  | 50 | 0 | 100 |  |
| User6 | 0 | 100 | 100 |  | 100 | 50 |
| User7 |  |  | 100 | 0 |  | 50 |
| User14 |  | 50 |  | 0 | 100 | 0 |
| User16 | 100 |  | 100 | 50 |  | 0 |

TABLE 2.2

| User Id | Mobility | Criticality | Security | Support | Workload | Grade |
|---|---|---|---|---|---|---|
| User1 | 0 | 100 | 100 | 50 | 100 | 100 |
| User2 | 0 | 100 | 100 | 50 | 100 | 50 |
| User4 | 0 | 100 | 100 | 0 | 100 | 100 |
| User8 | 0 | 50 | 100 | 0 | 100 | 50 |
| User9 | 100 | 100 | 100 | 50 | 100 | 100 |
| User10 | 0 | 50 | 50 | 0 | 100 | 50 |

TABLE 2.2-continued

| User Id | Mobility | Criticality | Security | Support | Workload | Grade |
|---|---|---|---|---|---|---|
| User11 | 0 | 50 | 50 | 50 | 100 | 100 |
| User12 | 0 | 50 | 50 | 0 | 100 | 50 |
| User13 | 0 | 50 | 50 | 50 | 100 | 50 |
| User15 | 0 | 100 | 100 | 0 | 100 | 50 |
| User17 | 0 | 50 | 50 | 0 | 100 | 50 |
| User18 | 0 | 50 | 100 | 0 | 50 | 100 |
| User19 | 0 | 100 | 50 | 50 | 100 | 50 |
| User20 | 0 | 100 | 100 | 0 | 100 | 50 |

For instance, user 3, user 5, . . . , user 16 are segregated from the other users user1, user2, user4, user8 , . . . , user 20 into the first group represented by table 2.1 as the users have one or more incomplete attribute values. In an implementation of the present subject matter, the first group may be utilized as a gap dataset and the second group may be utilized as a training dataset for predicting attribute values for the one or more incomplete attribute values of the users in the gap dataset. Thereafter, the segregating module 212 may provide the first group and the second group to the computing module 108.

In an implementation, after receiving the first group and the second group, the computing module 108 may analyze the first group to identify a user from amongst the one or more users with one or more incomplete attribute values for one or more attributes. Thereafter, the computing module 108 may select an incomplete attribute value from amongst the one or more incomplete attribute values for an attribute from amongst the one or more attributes for which an attribute value is to be predicted. In a scenario, the incomplete attribute value may be selected either randomly or based on its position, such as first, within the row associated with the user of the first group.

In an implementation of the present subject matter, a decision value set may be populated for the identified user. The decision value set includes the row of the identified user with attribute values across the multiple attributes. In the decision value set, a value 0 is assigned to an attribute value that is complete and a value 1 is assigned to an attribute value that is incomplete. In the said implementation, the computing module 108 may then iterate through the decision value set to select a value 1 for the incomplete attribute value that is to be further processed in order to predict an attribute value for the incomplete attribute value.

After selecting the incomplete attribute value, the computing module 108 may identify one or more suggestive attribute values for the incomplete attribute value of the attribute. The one or more suggestive attribute values can be understood as attribute values of the attribute associated with the other users of the second group. In the said example implementation, the computing module 108 identifies the user 3 with an incomplete attribute value for the attribute mobility from table 2.1 and traverses through the attribute values for mobility for the other users in table 2.2. As can be gathered from table 2.2, the attribute value for mobility for the other users is either 0 or 100, therefore the computing module 108 selects the value 0 and 100 as the one or more suggestive attribute values for the incomplete attribute value for mobility of the user 3.

Once the one or more suggestive attribute values are identified, the computing module 108 may then compute prior probability for a suggestive attribute value from amongst the one or more suggestive attribute values. The prior probability may be computed based on number of users in the second group having the suggestive attribute value as attribute value for the attribute and total number of users in the second group. For instance, the prior probability for the suggestive attribute value 0 is computed based on number of users with value 0 as the attribute value for mobility in the second group and the total number of users in the second group. In an example, the prior probability for the one or more suggestive attribute values is computed using the equation:

$$\text{Prior Probability} = \frac{\text{Number of users with the suggestive value as attribute value for the attribute in the second group}}{\text{Total number of users in the second group}} \quad (1)$$

From the table 2.2, it can be gathered that the number of users with the suggestive attribute value 0 as the attribute value for mobility in the second group is 13, and the total number of users in the second group is 14. Therefore, applying the equation (1), prior probability for the suggestive attribute value 0 can be computed as: prior probability (0)=13/14=0.928. Similarly, the prior probability can be computed for the remaining suggestive attribute values from amongst the one or more suggestive attribute values.

Thereafter, the computing module 108 may compute likelihood for the suggestive attribute value. The likelihood may be computed based on number of users in the second group with the suggestive attribute value as the attribute value for the attribute and attribute values for attributes, other than the attribute, similar to the attribute values for the attributes of the user. The likelihood may also be computed based on the total number of users within the second group with the suggestive attribute value as the attribute value for the attribute. In other words, the computing module 108 identifies users with attribute value 0 for mobility from the table 2,2. Thereafter, the attribute values for the attributes, other than mobility of such users are compared with the attribute values of the attributes of the user 3. Based on the comparison, the computing module 108 identifies users from the table 2.2 with similarity in the attribute values of the attributes with the attribute values of the user 3 and then computes the likelihood. In an example, the likelihood is computed using the equation:

$$\text{Likelihood for an attribute} = \frac{\text{Number of users in the second group with suggestive attribute value for the attribute and other attribute values similar to the attribute values of the user}}{\text{Total number of users in the second group with the suggestive attribute value for the attribute}} \quad (2)$$

In the example implementation, it can be gathered from the table 2.2 that user1, user2, user4, user8, user10, user11, user 12, user 13, user 15, user 17, user 18, user 19 and user 20 have the suggestive attribute value 0 as the attribute value for mobility. Thereafter, the attribute value 100 for the attribute criticality of the user 3 is compared with attribute values of criticality of such users to identify that user 1, user 2, user 4, user 15, user 19 and user 20 have attribute value 100 for criticality. Therefore, the number of users in the table 2.2 with the suggestive attribute value 0 as the attribute value for mobility and attribute value 100 for the attribute criticality is 6. Also, the total number of users within the table 2.2 with the suggestive attribute value 0 as the attribute value for the attribute mobility is 13. Therefore, likelihood for the suggestive attribute value 0 for the attribute criticality, using the equation (2), is 6/13=0.462. Accordingly, likelihood can be computed for the other attributes security, support and grade for the user 3.

In an implementation of the present subject matter, the computing module 108 may then compute a total likelihood for the suggestive attribute value. The total likelihood value is computed based on product of the likelihood values for each attribute. In the example implementation, likelihood for the attribute criticality is 0.462, likelihood for security is 7/13=0.539, likelihood for the attribute support is 8/13=0.615, and the likelihood for the attribute grade is 9/13=0.692. Therefore, the total likelihood for the suggestive value 0 for the user 3 is:

Total likelihood=0.462×0.539×0.15×0.692=0.106

In a similar manner, the total likelihood can be computed for the remaining suggestive attribute values.

After computing the total likelihood for each suggestive attribute value, the computing module 108 may compute the posterior probability for the suggestive attribute value. The posterior probability is computed based on the prior probability of the suggestive attribute value and the likelihood of the suggestive attribute value. In an example, the posterior probability is computed using the equation:

$$\text{Posterior Probability} = \text{Prior probability} \times \text{Total likelihood} \quad (3)$$

Therefore, using the equation (3), the posterior probability of the suggestive attribute value 0 is 0.928×0.106=0.098. The posterior probability for the remaining suggestive attribute values can be computed in a similar manner. For instance, the posterior probability for the suggestive attribute value 100 is computed to be 0.018 based on the techniques described for the suggestive attribute value 0.

After computing the posterior probability for each suggestive attribute value from amongst the one or more suggestive attribute values, the computing module 108 may share the posterior probability of each suggestive attribute value with the predicting module 216. Upon receiving the posterior probability for each suggestive attribute value, the predicting module 216 may compare the posterior probability of each suggestive attribute value with posterior probabilities of the remaining suggestive attribute values to identify a suggestive attribute value with the highest posterior probability. Thereafter, the predicting module 216 may select the suggestive attribute value with the highest posterior probability and recommend the selected suggestive attribute value as the attribute value for the incomplete attribute value for the attribute associated with the user.

In the example implementation, the predicting module 216 compares the posterior probability 0.098 of suggestive attribute value 0 with the posterior probability 0.018 of suggestive attribute value 100. Thereafter, the predicting module 216 selects and recommends the suggestive attribute value 0 as the attribute value for the incomplete attribute value for the user 3 as the suggestive attribute value 0 has a higher posterior probability than that of suggestive attribute value 100. Accordingly, attribute values for the other incomplete attribute values from amongst the one or more incomplete attribute values for the user are predicted. The process of predicting the attribute value is then performed for each user from amongst the one or more users of the first group to obtain an attribute value for each incomplete attribute value associated with each user of the first group. Thereafter, the first group with complete attribute value for each attribute of users may be combined with the second group to obtain the user model with complete attribute value for each attribute associated with each user from amongst the multiple users associated with the enterprise.

In an implementation of the present subject matter, a Naïve Bayesian probabilistic computation may be utilized by the computing module 108 to predict the attribute value for the incomplete attribute value for the attribute of the user. In the Naïve Bayesian probabilistic computation, the computing module 108 may utilize the gap dataset and the training dataset as input to a recommending algorithm. The computing module 108 may then process the gap dataset and the training dataset by executing functions associated with computing total likelihood, posterior probability and recommending segment of the recommending algorithm to obtain a user set as an output. The user set includes users with a complete attribute value for each incomplete attribute value. The user set may then be utilized to obtain the user model with a complete attribute value for each attribute associated with each user from amongst the multiple users associated with the enterprise.

In an implementation of the present subject matter, the user model with complete attribute value for each attribute associated with each user may then be accessed by the clustering module 214 to cluster the user model in two or more segments. Each segment represents a set of users with similar attribute values for the attributes. The clustering module 214 may obtain the two or more segments by utilizing past segmentation results that may include data related to past segments, such as average number of segments, and range of attribute values for the attributes in each segment from amongst the past segments. In a scenario, the clustering module 214 may utilize a clustering technique to obtain the two or more segments when the past segmentation results are not available. The information corresponding to the two or more segments may then be stored as other data 222 for future segmentation of users associated with the enterprise.

The segmenting of the user model into the two or more segments by the clustering module 214 can be understood as completion of the holistic approach. Hence, after completion of the holistic approach, each user from amongst the multiple users is segmented appropriately in an optimal segment from amongst the existing segments. The holistic approach is observed to provide improved accuracy over the existing techniques in predicting the attribute values for the incomplete attribute values.

In the segment based approach, the attribute values for the user is predicted based on identifying an optimal segment for the user and then determining attribute values for the incomplete attribute values associated with the user. In particular, for identifying the optimal segment for the user, the clustering module 214 may cluster the second group that includes the other users with complete attribute value for each attribute into two or more segments.

TABLE 3

| User Id | Mobility | criticality | security | support | workload | Grade |
|---|---|---|---|---|---|---|
| User1 | 0 | 100 | 100 | 50 | 100 | 100 |
| User2 | 0 | 100 | 100 | 50 | 100 | 50 |
| User4 | 0 | 100 | 100 | 0 | 100 | 100 |
| User9 | 100 | 100 | 100 | 50 | 100 | 100 |

TABLE 3-continued

| User Id | Mobility | criticality | security | support | workload | Grade |
|---|---|---|---|---|---|---|
| User15 | 0 | 100 | 100 | 0 | 100 | 50 |
| User20 | 0 | 100 | 100 | 0 | 100 | 50 |

Table 3 illustrates a segment from amongst the two or more segments obtained by clustering the second group of table 2.2. The clustering module 214 may cluster the second group based on the past segmentation results or the clustering technique. The clustering module 214 may then provide the information corresponding to the two or more segments to the computing module 108.

The computing module 108 may then select a segment from amongst the two or more segments to determine whether the user with the incomplete attribute is to be grouped into the segment based on similarity in attribute values of the user and the attribute values of the users of the segment. In the example implementation, the computing module 108 selects the segment as shown in table 3 and determines whether the user 3 from table 2.1 is to be grouped into the segment of table 3 based on similarity in attribute values of the user 3 and the attribute values of the users of the table 3. The computing module 108 may then compute the prior probability of the segment based on number of users in the segment and the total number of users in the two or more segments. For instance, the number of users in the segment of table 3 is 6 and the total number of users in the two or more segments is 14, therefore the prior probability of the segment is 6/14=0.429.

In an implementation, after computing the prior probability, the computing module 108 may compute the likelihood of the segment based on the number of users in the segment with attribute value similar to the complete attribute values of the user. For example, considering user3 to be grouped into the segment of table 3, the number of users in the table 3 with 100 as second attribute value is 6. The number of users in the segment is also 6 and therefore the likelihood for the segment is 6/6=1.

Thereafter, the computing module 108 may compute total likelihood of the segment based on techniques described in the holistic approach for computing total likelihood. After computing the total likelihood, the computing module 108 may compute posterior probability for the segment based on techniques described in the holistic approach. The computing module 108 may then compute posterior probability for each segment from amongst the two or more segments. Once the posterior probability is computed for each segment, the computing module 108 may select a segment with the highest posterior probability as the segment for the user.

In an implementation, after determining the segment for the user, the computing module 108 may select one or more suggestive attribute values for the incomplete attribute value of the attribute of the user. After selecting the one or more suggestive attribute values, the computing module 108 may compute prior probability, likelihood and posterior probability for each suggestive attribute value from amongst the one or more suggestive attribute values based on the attribute values of the users of the segment by using techniques described in the holistic approach. Thereafter, the computing module may provide information related to posterior probability for each suggestive attribute value to the predicting module 216. The predicting module 216 may compare the posterior probability of each suggestive attribute value with that of the remaining suggestive attribute values to identify a suggestive attribute values with highest posterior probability. The predicting module 216 may then recommend the selected suggestive attribute value as the attribute value of the incomplete attribute of the user.

The predicting of the attribute values for each incomplete attribute value of the users based on their segments by the predicting module 216 can be understood as completion of the segment based approach. Hence, after completion of the segment based approach, each user from the first group has an attribute value for each incomplete attribute value based on a corresponding segment of the user.

Further, the process of predicting the attribute values and performing user segmentation and functioning of components of the user segmenting system 104 have been described based on a dynamic segmenting approach. In the dynamic segmenting approach, one or more users from amongst the multiple users with change in one or more attribute values are segmented into corresponding one or more segments from amongst the existing segments. The change in one or more attribute values may be due to factors, such as change in user behaviour, user role change, technology change, experience gained, and environment change. In a scenario, the dynamic segmenting approach may also be utilized for segmenting new users who have joined the enterprise. The new users may be segmented based on user's role in the enterprise, computing resource needs and a target IT workspace.

In particular, the clustering module 214 may track the one or more attribute values of one or more attributes associated with the one or more users to determine a change in the one or more attribute values. After tracking the change, the clustering module 214 may provide the information about changed attribute values to the computing module 108. The computing module 108 may determine if the one or more users with the one or more changed attribute values can be mapped into the existing segments. Upon determining whether the one or more users can be mapped to the existing segments, the computing module 108 may provide the information about mapping to the clustering module 214.

In an implementation, the clustering module 214 may re-align the one or more users by assigning the one or more users to the existing segments based on the changed one or more attribute values when the one or more users are determined to be mapped to the existing segments. During the re-aligning, a user may be assigned to either the same segment or to another segment based on the changed one or more attribute values. For instance, if the user3 was assigned to segment 1 based on the initial attribute values of the attributes, then due to change in the one or more attribute values, the user can be either assigned to segment 1 or to segment 3. The determination of re-aligning the user 3 to either segment 1 or segment 3 may depend on closeness between the changed one or more attribute values and maximum and minimum limits of the one or more attribute values within the segment 1 and maximum and minimum limits of the one or more attribute values within the segment 3.

If the computing module 108 determines that the one or more users may not be mapped into the existing segments, then the computing module 108 may determine one or more new segments that may be generated to accommodate the one or more users. The computing module 108 may provide the information associated with the one or more new segments to the clustering module 214. The clustering module 214 may then generate the one or more new segments for the one or more users by utilizing one of the past segmentation results and the clustering technique. In a scenario, the one or more new segments are generated based on the changed one or more attribute values associated with the one or more e users. Thereafter, the clustering module 214 may assign the one or more users into the one or more new segments based on the changed one or more attribute values.

The assigning of the one or more users into the one or more new segments by the clustering module 214 can be understood as completion of the dynamic segmenting approach. The dynamic segmenting approach is observed to have improved time efficiency as compared to the conventional techniques in dynamically segmenting the one or more users with changed one or more attribute values, Further, the dynamic segmenting approach is observed to have improved quality of segments in terms of users and their attribute values within the segments.

To this end, there are multiple segments existing within the enterprise that includes users with similarity in IT needs and user behaviour. Further, generation of new segments in response to change in attribute values of the users may result in an increased number of segments within the enterprise. Therefore, maintenance of such large number of segments can be an expensive and resource intensive task for the enterprise as a large amount of IT resources may be assigned and then continuously be engaged to manage each segment. The present subject matter provides an optimal technique for maintaining the segments by eliminating some segments which were not associated with a user from amongst the multiple users for some time.

In particular, the clustering module 214 may monitor one or more segments from amongst the existing segments that are not associated with any user for a predefined time period. The predefined time period can be understood as one of, a time elapsed between predefined number of iterations of segmentation, and a predefined number of days or weeks or months or quarters. The predefined time can also be related to different events, such as appraisal cycles, financial reviews, mergers and acquisition, and reorganization of enterprises, etc. In an implementation, the clustering module 214 may monitor the one or more segments for the predefined time to ensure that users do not get assigned to the one or more segments due to change in their attribute values. If the one or more segments are not associated with a user for the predefined time then the clustering module 214 may eliminate the one or more segments from the existing segments. Thus, the described technique regulate the number of segments based on association of users with the segments to always maintain optimal number of segments within the enterprise thereby providing efficient use of the available IT resources.

Figure 3:
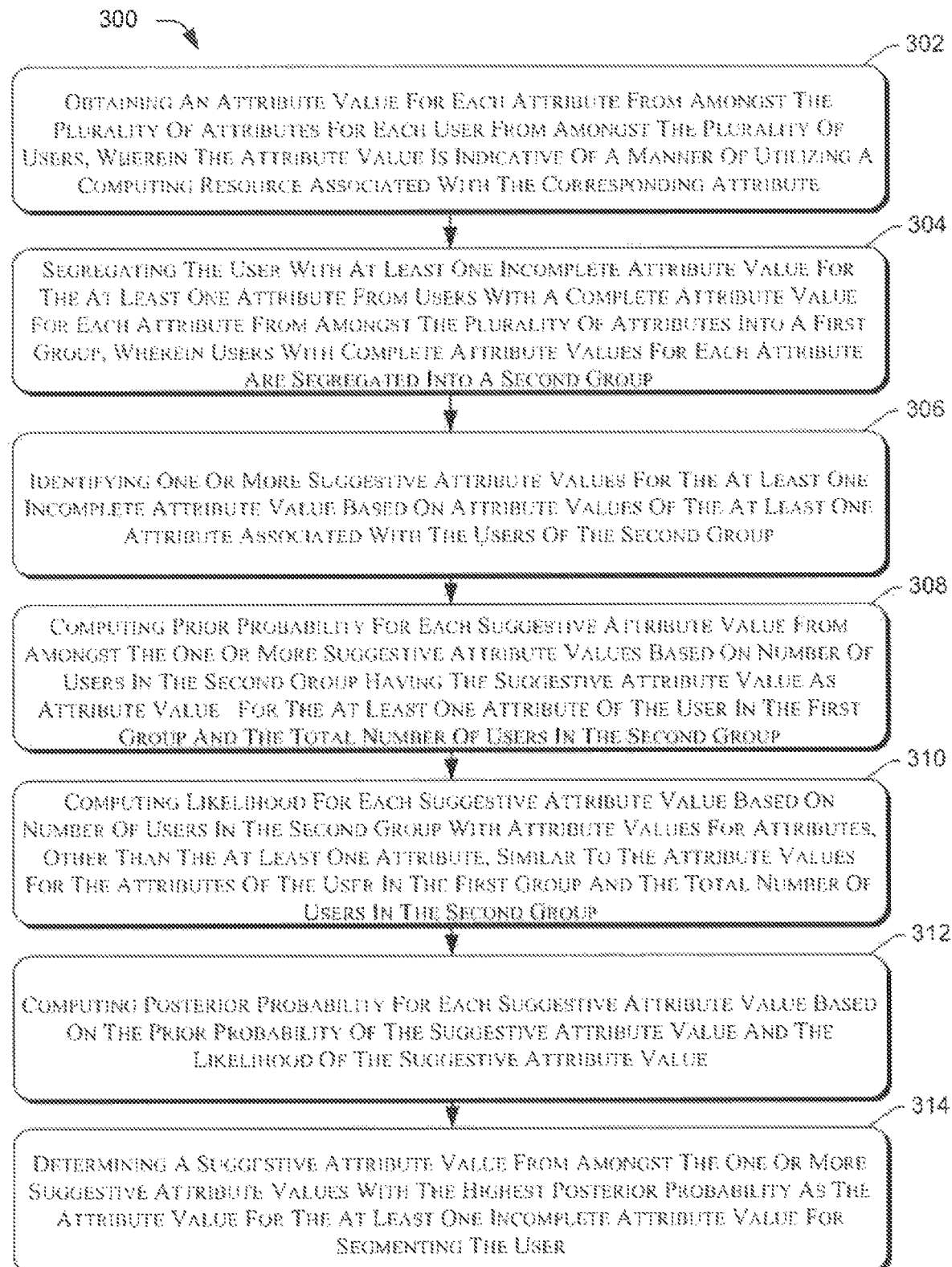
FIG. 3 illustrates a method for predicting an attribute value corresponding to a user for segmentation, according to an implementation of the present subject matter.
Figure 4:
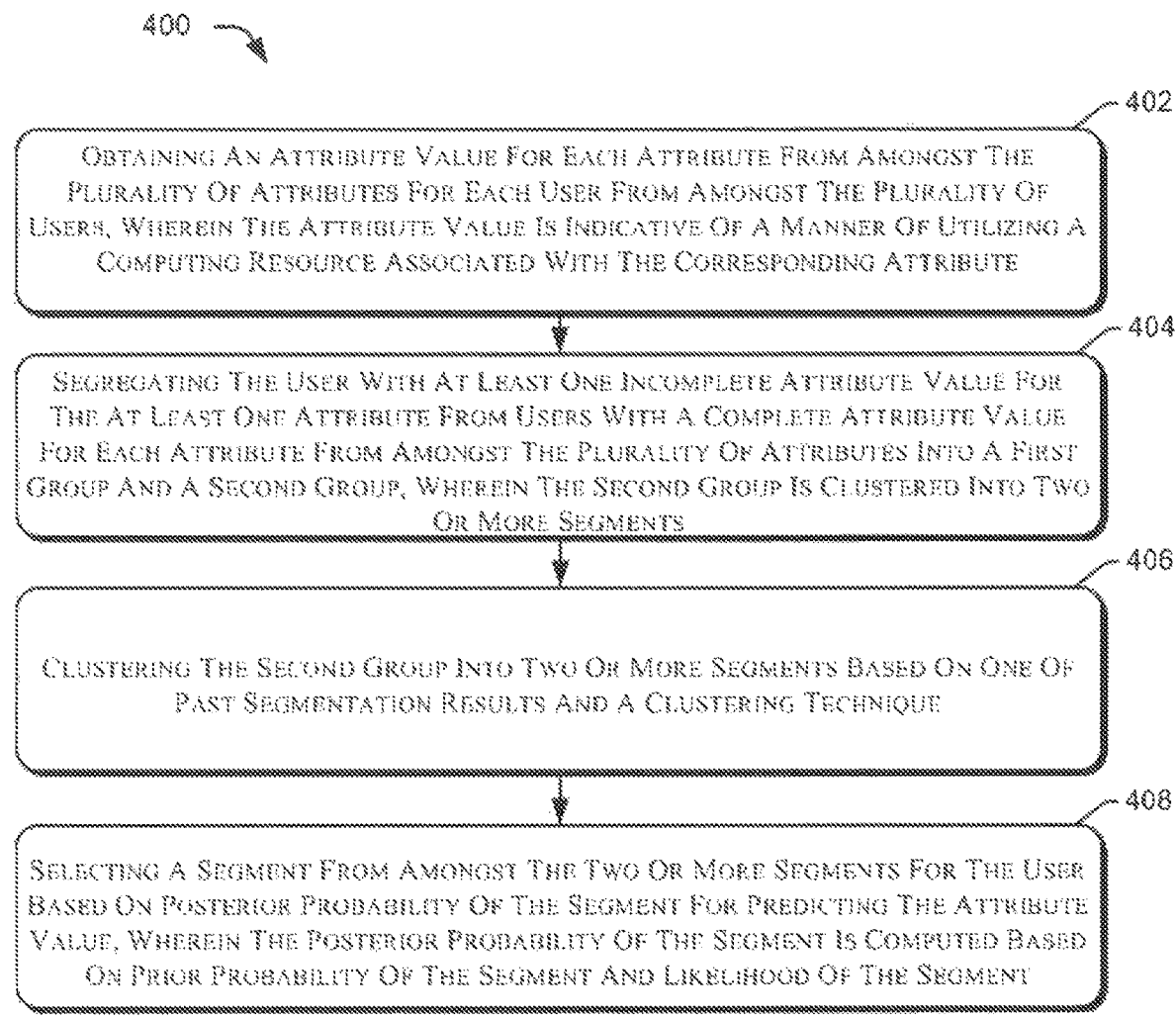
FIG. 4 illustrates a method for predicting the attribute value corresponding to a user of a segment, according to an implementation of the present subject matter.
Figure 5:
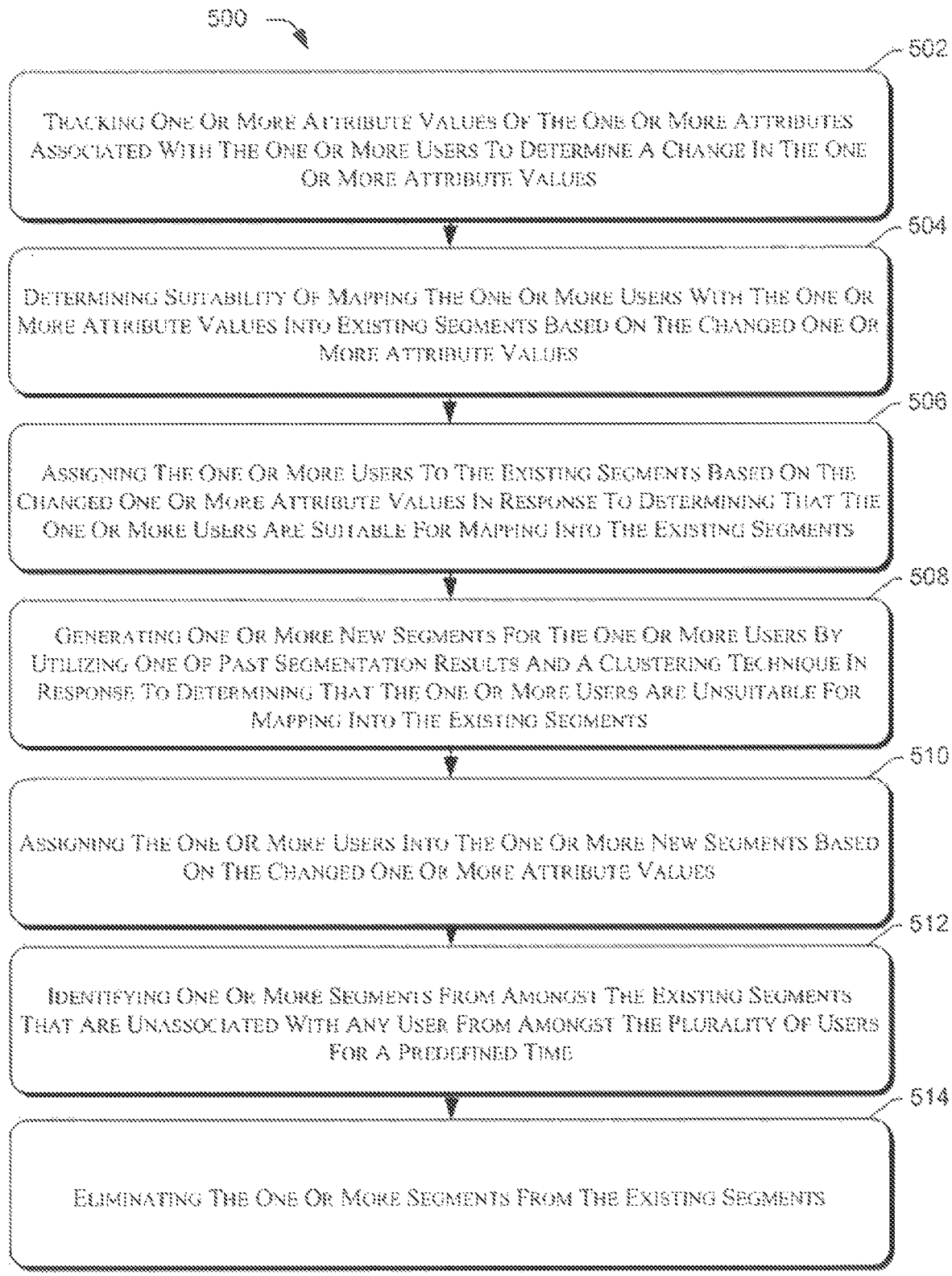
FIG. 5 illustrates a method for segmenting a user into existing segments based on change in one or more attribute values over a time period, according to an implementation of the present subject matter.

FIG. 3, FIG. 4 and FIG. 5 illustrate methods 300, 400 and 500 in accordance with implementations of the present subject matter. The order in which the methods 300, 400, and 500 are described is not intended to be construed as a limitation, and any number of the described method blocks may be combined in any order to implement the methods 300, 400, and 500 or an alternative method. Furthermore, the methods 300, 400, and 500 may be implemented by processor(s) or computing system(s) through any suitable hardware, non-transitory machine readable instructions, or combination thereof.

It may be understood that steps of the methods 300, 400, and 500 may be performed by programmed computing systems. The steps of the methods 300 and 400 may be executed based on instructions stored in a non-transitory computer readable medium, as will be readily understood. The nor-transitory computer readable medium may include, for example, digital memories, magnetic storage media, such as one or more magnetic disks and magnetic tapes, hard drives, or optically readable digital data storage media. In an implementation of the present subject matter, the methods 300 and 400 may be executed by the location detection system 102, as described earlier.

FIG. 3 illustrates a method for predicting an attribute value corresponding to a user for segmenting the user into exiting segments of an enterprise, according to an implementation of the present subject matter. At block 302, an attribute value is obtained for each attribute from amongst multiple attributes for each user from amongst multiple users. The attribute value is indicative of a manner of utilizing a computing resource associated with the corresponding attribute. In an implementation, the collection module 210 may obtain the attribute value for each attribute for each user.

At block 304, a user with one or more incomplete attribute value for one or more attributes is segregated from users with a complete attribute value for each attribute from amongst the multiple attributes into a first group and the users with complete attribute values for each attribute are segregated into a second group. In an implementation, the segregating module 212 segregates the user with the one or more incomplete attribute value in the first group and the users with complete attribute values for each attribute in the second group.

At block 306, one or more suggestive attribute values are identified for the one or more incomplete attribute value based on attribute values of the one or more attribute associated with the users of the second group. In an implementation, the computing module 108 may identify the one or more suggestive attribute values for the one or more incomplete attribute values. At block 308, prior probability for the one or more suggestive attribute values is computed based on number of users in the second group having the one or more suggestive attribute values as attribute value for the one or more attributes and the total number of users in the second group. In an implementation, the computing module 108 may compute the prior probability for the one or more suggestive attribute values.

Further, at block 310, likelihood for the one or more suggestive attribute values based on number of users in the second group with attribute values for attributes, other than the at least one attribute, similar to the attribute values for the attributes of the user and the total number of users in the second group. At block 312, posterior probability for the one or more suggestive attribute values is computed based on the prior probability of the one or more suggestive attribute values and the likelihood of the one or more suggestive attribute values. In an implementation, the computing module 108 may compute the likelihood and the posterior probability of the one or more suggestive attribute values.

At block 314, a suggestive attribute value from amongst the one or more suggestive attribute values with the highest posterior probability is determined as the attribute value for the one or more incomplete attribute values for segmenting the user.

FIG. 4 illustrates a method for predicting an attribute value corresponding to a user of a segment, according to an implementation of the present subject matter. At block 402, an attribute value for each attribute is obtained from amongst the multiple attributes for each user from amongst the multiple users. In an implementation, the collection module 210 may obtain the attribute value for each attribute for each user. At block 404, a user with one or more incomplete attribute value for one or more attributes is segregated from users with a complete attribute value for each attribute from amongst the multiple attributes into a first group and the users with complete attribute values for each attribute are segregated into a second group. In an implementation, the segregating module 212 segregates the user with the one or more incomplete attribute value in the first group and the users with complete attribute values for each attribute in the second group.

Thereafter, at block 406, the second group is clustered into two or more segments based on one of past segmentation results and a clustering technique. In an implementation, the clustering module 214 may cluster the second group into the two or more segments. At block 408, a segment is selected from amongst the two or more segments for the user based on posterior probability of the segment for predicting the attribute value. The posterior probability of the segment is computed based on prior probability of the segment and likelihood of the segment. In an implementation, the clustering module 214 may select the segment from amongst the two or more segments based on the posterior probability.

FIG. 5 illustrates a method for segmenting a user into existing segments based on change in one or more attribute values, according to an implementation of the present subject matter. At block 502, one or more attribute values of the one or more attributes associated with the one or more users are tracked to determine a change in the one or more attribute values. In an implementation, the clustering module 214 may track the one or more attribute values of the one or more attributes of the user. At block 504, suitability of mapping the one or more users with the one or more attribute values into the existing segments is determined based on the changed one or more attribute values. In an implementation, the computing module 108 may determine the suitability of mapping the one or more users into the existing segments.

Thereafter, at block 506, the one or more users are assigned to the existing segments based on the changed one or more attribute values in response to determining that the one or more users are suitable for mapping into the existing segments. In an implementation, the clustering module 214 may assign the one or more users into the existing segments based on the changed one or more attribute values.

At block 508, one or more new segments are generated for the one or more users by utilizing one of past segmentation results and a clustering technique. The one or more new segments are usually generated when the one or more users are determined to be unsuitable for mapping into the existing segments. In an implementation, the clustering module 214 may generate the one or more new segments for the one or more users by utilizing one of the past segmentation results and the clustering technique.

After generating the one or more new segments, the one or more users are then assigned into the one or more new segments based on the changed one or more attribute values at block 510. In an implementation, the clustering module 214 may assign the one or more users into the one or more new segments based on the changed one or more attribute values.

Thereafter, at block 512, one or more segments from amongst the existing segments are identified that are not associated with any user from amongst the plurality of users for a predefined time. In an implementation, the clustering module 214 may identify the one or more segments from amongst the existing segments that are not associated with any user for the predefined time. After identifying, the one or more segments are eliminated from the existing segments at block 514. In an implementation, the clustering module 214 may eliminate the one or more segments from the existing segments.

Thus, the described method and system provide a higher degree of accuracy in predicting attribute values for the user based on prior probability, likelihood and posterior probability. Further, the described method and system provide a time-efficient technique of dynamically segmenting users into existing segments or new segments in response to change in behavior of the users thereby optimizing usage of IT resources. The described method and system are also cost efficient as they prevent maintenance of unused and unassociated segments by eliminating such segments from the existing segments.

Although implementations of present subject matter have been described in language specific to structural features and/or methods, it is to be understood that the present subject matter is not necessarily limited to the specific features or methods described. Rather, the specific features and methods are disclosed and explained in the context of a few example implementations for location determination systems.

What is claimed is:

1. A method for predicting an attribute value associated with a user for segmenting the user into a segment, the segment being indicative of users utilizing similar computing resources, the method comprising:

obtaining, by a processor, an attribute value for each attribute from amongst a plurality of attributes associated with each user from amongst a plurality of users, wherein the plurality of attributes is common to each user from amongst the plurality of users, and wherein the attribute value is indicative of current usage of a computing resource by the user, wherein the attribute value for each attribute is associated with one or more factors comprising a location of accessing a device, mobility of the user, and degree of mobility of the user;

segregating, by said processor, the user with at least one incomplete attribute value for at least one attribute from users with complete attribute values for each attribute from amongst the plurality of attributes, into a first group, wherein the first group includes the user with the at least one incomplete attribute value, and wherein users with complete attribute values for each attribute are segregated into a second group;

identifying, by said processor, one or more suggestive attribute values for the at least one incomplete attribute value of the user in the first group based on attribute values of the at least one attribute associated with the users of the second group;

computing, by said processor, prior probability for each suggestive attribute from amongst the one or more suggestive attribute values based on a ratio of number of users in second group having the suggestive attribute value as attribute value for the at least one attribute of the user in the first group and a total number of users in the second group;

computing, by said processor, likelihood for each suggestive attribute value based on a ratio of the number of users in the second group with attribute values for attributes, other than the at least one attribute, same as the attribute values for the attributes of the user in the first group and the total number of users in the second group;

computing, by said processor, posterior probability for each suggestive attribute value based on the prior probability of the one or more suggestive attribute values and the likelihood of the one or more suggestive attribute values; and determining, by said processor, a suggestive attribute value from amongst the one or more suggestive attribute values with the highest posterior probability as the attribute value for the at least one incomplete attribute value for segmenting the user;

wherein the attribute value for each attribute is associated with the one or more factors and further includes type of applications and devices used by users, number and manner of interaction with devices, level of access, role and autonomy of the users associated with an enterprise, collaborative resources, device ownership, user privacy, and remote data access.

2. The method of claim 1, wherein computing likelihood for each suggestive attribute value comprises computing a total likelihood for each suggestive attribute value based on likelihood for each attribute of the user for the suggestive attribute value.

3. The method of claim 1 further comprising:

tracking one or more attribute values of the one or more attributes associated with the one or more users to determine a change in the one or more attributes values;

re-aligning one or more users from amongst the plurality of users into existing segments, the re-aligning comprising:

determining suitability of mapping the one or more users with the one or more attribute values into the existing segments based on the changed one or more attribute values;

assigning the one or more users to the existing segments based on the changed one or more attribute values in response to determining that the one or more users are suitable for mapping into the existing segments, wherein a user from amongst the one or more users can be assigned to another segment, during the realigning.

4. The method of claim 3 further comprising:

identifying the one or more users to be segmented into new segments based on the determining that the one or more users are not suitable for mapping into the existing segments;

generating one or more new segments for the one or more users by utilizing one of the past segmentation results and a clustering technique, wherein the one or more new segments are generated based on the changed one or more attribute values of the one or more users; and assigning the one or more users to the one or more new segments based on the changed one or more attribute values.

5. The method of claim 3 further comprising:

identifying one or more segments from amongst the existing segments that are unassociated with any user from amongst the plurality of users for a predefined time; and eliminating the one or more segments from the existing segments.

6. A method for predicting an attribute value associated with a user of a segment, the segment being indicative of users utilizing similar computing resources associated with an enterprise, the method comprising:

obtaining, by a processor, an attribute value for each attribute from amongst a plurality of attributes associated with each user from amongst a plurality of users, wherein the plurality of attributes is common to each user from amongst the plurality of users, and wherein the attribute value is indicative of current usage of a computing resource by the user, wherein the attribute value for each attribute is associated with one or more factors comprising a location of accessing a device, mobility of the user, and degree of mobility of the user;

segregating, by said processor, the user with at least one incomplete attribute value for at least one attribute from users with complete attribute values for each attribute from amongst the plurality of attributes, into a first group, wherein the first group includes the user with the at least one incomplete attribute value, wherein users with complete attribute values for each attribute are segregated into a second group;

clustering, by said processor, the second group into two or more segments based on one of past segmentation results and a clustering technique if past segmentation result is not available;

selecting, by said processor the segment from amongst the two or more segments for the user in the first group based on posterior probability of the segment for predicting the attribute value, wherein the posterior probability of the segment is computed based on prior probability of the segment and likelihood of the segment, wherein the prior probability is computed, by said processor, based on a ratio of number of users in each segment and a total number of users in the two or more segments, and the likelihood is computed, by said processor, based on the number of users in each segment with attribute values for attributes, other than the at least one attribute, same as the attribute values for the attributes of the user;

further wherein the attribute value for each attribute is associated with the one or more factors and further includes type of applications and devices used by users, number and manner of interaction with devices, level of access, role and autonomy of the users associated with an enterprise, collaborative resources, device ownership, user privacy, and remote data access.

7. The method of claim 6 further comprising:

identifying one or more suggestive attribute values for the at least one incomplete attribute value of the user in the first group based on attribute values of the at least one attribute associated with the users of the selected segment from the two or more segments from the user in the first group;

computing prior probability for each suggestive attribute value from amongst the one or more suggestive attribute values based on the ratio of the number of users in the selected segment having the suggestive attribute value as attribute value for the at least one attribute of the user in first group and the total number of users in the selected segment;

computing likelihood for each suggestive attribute value based on the ratio of the number of users in the selected segment with attribute values for attributes, other than the at least one attribute, same as the attribute values for the attributes of the user and the total number of users in the selected segment;

computing posterior probability for each suggestive attribute value based on the prior probability of the suggestive attribute value and the likelihood of the suggestive attribute value; and selecting suggestive attribute value from amongst the one or more suggestive attribute values with the highest posterior probability as the attribute value for the at least one incomplete attribute value.

8. A user segmenting system for predicting an attribute value for at least one attribute from amongst a plurality of attributes associated with a user from amongst a plurality of users for segmenting the user into a segment, the segment being indicative of users utilizing similar computing resources, the user segmenting system comprising:

a processor;

a memory coupled to the processor, wherein the processor executes a plurality of modules stored in the memory, and wherein the plurality of modules comprises:

a collection module to obtain an attribute value for each attribute from amongst the plurality of attributes for each user from amongst the plurality of users, wherein the plurality of attributes is common to each user of the plurality of users, wherein the attribute value is indicative of current usage of a computing resource associated with the corresponding attribute, wherein the attribute value for each attribute is associated with one or more factors comprising a location of accessing a device, mobility of the user, and degree of mobility of the user; and a segregating module to segregate the user with at least one incomplete attribute value for the at least one attribute from users with a complete attribute value for each attribute from amongst the plurality of attributes, into a first group, wherein the first group includes the user with the at least one incomplete attribute value, and wherein the users with complete attribute value for each attribute is segregated into a second group;

a computing module configured to:

identify one or more suggestive attribute values for the at least one incomplete attribute value of the user in first group based on attribute values of the at least one attribute associated with the users of the second group;

compute prior probability for each suggestive attribute value from amongst the one or more suggestive attribute values based on a ratio of number of users in second group having a suggestive attribute value as attribute value for the incomplete attribute of the user in first group and a total number of users in the second group;

compute likelihood for each suggestive attribute value based on a ratio of the number of users in the second group with attribute values for attributes, other than the at least one attribute, same as the attribute values for the attributes of the user; and compute posterior probability for the one or more suggestive attribute values based on the prior probability of the one or more suggestive attribute values and the likelihood of the one or more suggestive attribute values;

a predicting module to recommend a suggestive attribute value from amongst the one or more suggestive attribute values with the highest posterior probability as the attribute value for the at least one incomplete attribute value for segmenting the user;

wherein the attribute value for each attribute is associated with the one or more factors and further includes type of applications and devices used by users, number and manner of interaction with devices, level of access, role and autonomy of the users associated with an enterprise, collaborative resources, device ownership, user privacy, and remote data access.

9. The system of claim 8 further comprising:

a clustering module to cluster the second group into two or more segments by utilizing one of past segmentation results and a clustering technique to select a segment from amongst the two or more segments for the user based on posterior probability of the segment, wherein the posterior probability of the segment is computed based on prior probability of the segment and likelihood of the segment.

10. The system of claim 9, wherein the clustering module is further configured to:
track one or more attribute values of the one or more attributes associated with the one or more users to determine a change in the one or more attributes values;
re-align one or more users from amongst the plurality of users into existing segments by tracking one or more attribute values of the one or more attributes associated with the one or more users to determine a change in the one or more attributes values;
determine if the one or more users with the one or more attribute values are suitable to be mapped into the existing segments based on the changed one or more attribute values;
assign the one or more users in the existing segments based on the changed one or more attribute values in response to determining that the one or more users can be mapped into the existing segments;
generate one or more new segments for the one or more users by utilizing one of the past segmentation results and the clustering technique to assign the one or more users to the one or more new segments;
assign the one or more users to the one or more new segments based on the changed one or more attribute values; and
identify the one or more segments from amongst the existing segments that are unassociated with any user from amongst the plurality of users for a predefined time; and
eliminate the one or more segments from the existing segments by identifying one or more segments from amongst the existing segments that are unassociated with any user from amongst the plurality of users for a predefined time.

11. The system of claim 8, wherein the computing module is further configured to:
identify one or more suggestive attribute values for the at least one incomplete attribute value of the user in first group based on attribute values of the at least one attribute associated with the users of the segment;
compute prior probability for each of the suggestive attribute values based on number of users in segment having suggestive attribute value as attribute value for the incomplete attribute of the user in first group and the total number of users in the segment;
compute total likelihood for the one or more suggestive attribute values based on likelihood of all the complete attribute values of user in first group, wherein likelihood of each attribute value of the user in first group is based on number of users with the same attribute value in segment;
compute posterior probability for the one or more suggestive attribute values based on the prior probability of the one or more suggestive attribute values and the total likelihood of the one or more suggestive attribute values; and
determine suitability of mapping the one or more users with the one or more attribute values into the existing segments based on the changed one or more attribute values.

12. A non-transitory computer-readable medium comprising instructions for predicting an attribute value for at least one attribute from amongst a plurality of attributes associated with a user for segmenting the user into a segment, the segment being indicative of users utilizing similar computing resources, executable by a processor resource to:
obtain an attribute value for each attribute from amongst the plurality of attributes for each user from amongst the plurality of users, wherein the plurality of attributes is common to each user of the plurality of users, wherein the attribute value is indicative of current usage of a computing resource associated with the corresponding attribute, wherein the attribute value for each attribute is associated with one or more factors comprising a location of accessing a device, mobility of the user, and degree of mobility of the user;
segregate the user with at least one incomplete attribute value for the at least one attribute from users with a complete attribute value for each attribute from amongst the plurality of attributes, into a first group, wherein the first group includes the user with the at least one incomplete attribute value, and wherein the users with complete attribute value for each attribute is segregated into a second group;
identify one or more suggestive attribute values for the at least one incomplete attribute value of the user in first group based on attribute values of the at least one attribute associated with the users of the second group;
compute prior probability for each suggestive attribute values from amongst the one or more suggestive attribute values based on a ratio of number of users in second group having the suggestive attribute value as attribute value for the at least one attribute of the user in first group and a total number of users in the second group;
compute likelihood for the one or more suggestive attribute values based on a ratio of the number of users in the second group with attribute values for attributes, other than the at least one attribute, same as the attribute values for the attributes of the user;
compute posterior probability for the one or more suggestive attribute values based on the prior probability of the one or more suggestive attribute values and the likelihood of the one or more suggestive attribute values; and
determine a suggestive attribute value from amongst the one or more suggestive attribute values with the highest posterior probability as the attribute value for the at least one incomplete attribute value for segmenting the user;
wherein the attribute value for each attribute is associated with the one or more factors and further includes type of applications and devices used by users, number and manner of interaction with devices, level of access, role and autonomy of the users associated with an enterprise, collaborative resources, device ownership, user privacy, and remote data access.

13. The non-transitory computer-readable medium of claim 12, wherein the instructions for predicting an attribute value for segmenting the user are further to:
select a segment from amongst two or more segments for the user based on posterior probability of the segment, wherein the posterior probability of the segment is computed based on prior probability of the segment and likelihood of the segment;
identify one or more suggestive attribute values for the at least one incomplete attribute value of the user in first group based on attribute values of the at least one attribute associated with the users of the segment;

compute prior probability for each suggestive attribute value from amongst the one or more suggestive attribute values based on number of users in the segment having the suggestive attribute value as attribute value for the at least one attribute of the user in the first group and the total number of users in the segment;

compute likelihood for each suggestive value based on a ratio of the number of users in the segment with attribute values for attributes, other than the at least one attribute, same as the attribute values for the attributes of the user and the total number of users in the segment;

compute posterior probability for each suggestive value based on the prior probability of the suggestive attribute value and the likelihood of the suggestive attribute value; and select a suggestive attribute value from amongst the one or more suggestive attribute values with the highest posterior probability as the attribute value for the at least one incomplete attribute value.

14. The non-transitory computer-readable medium as claimed in claim 12, wherein the instructions for predicting an attribute value for segmenting the user are further to:

track one or more attribute values of the one or more attributes associated with the one or more users to determine a change in the one or more attributes values;

re-align one or more users from amongst the plurality of users into existing segments, the re-align comprises:

determine suitability of mapping the one or more users with the one or more attribute values into the existing segments based on the changed one or more attribute values; and assign the one or more users in the existing segments based on the changed one or more attribute values in response to determining that the one or more users are suitable for mapping into the existing segments.

* * * * *